Jan. 25, 1966 A. SERAFINI 3,231,137
COMBINATION HANDLE AND SPOUT DEVICE
Filed Sept. 4, 1964
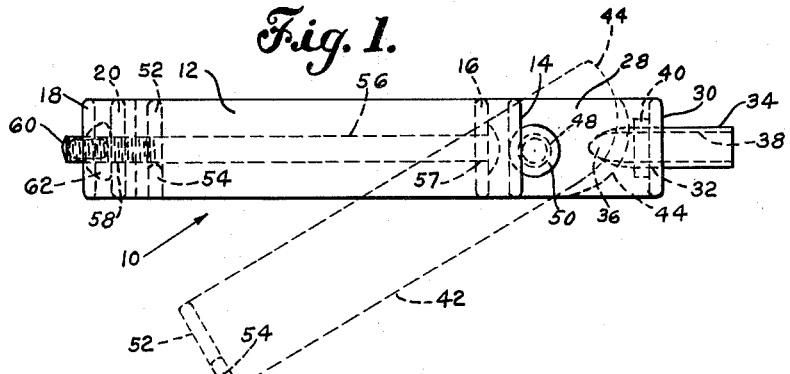
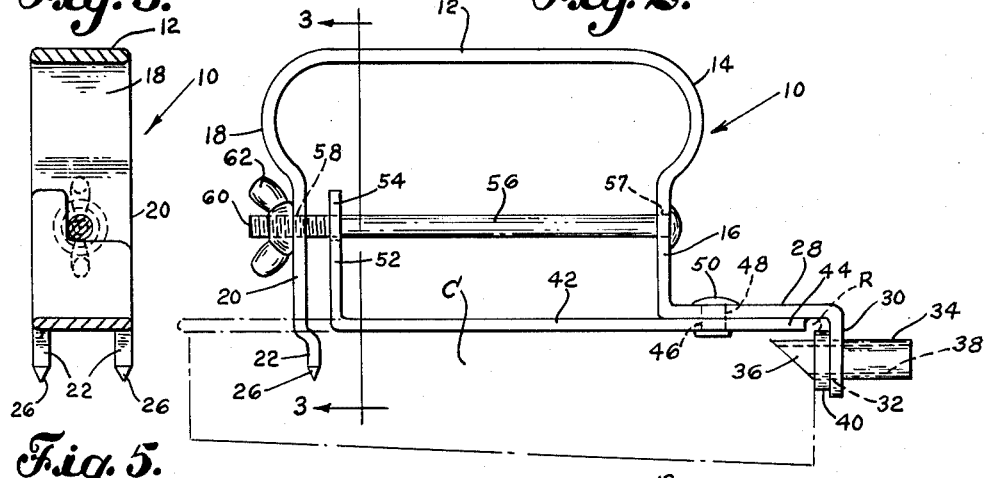
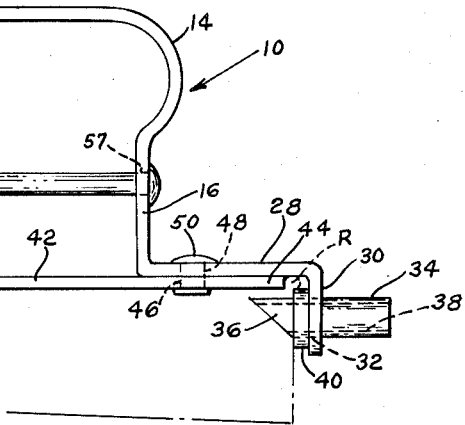
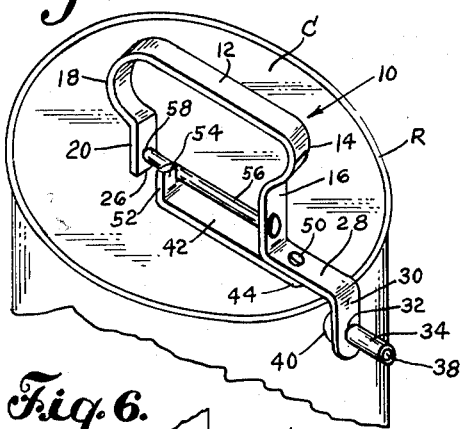
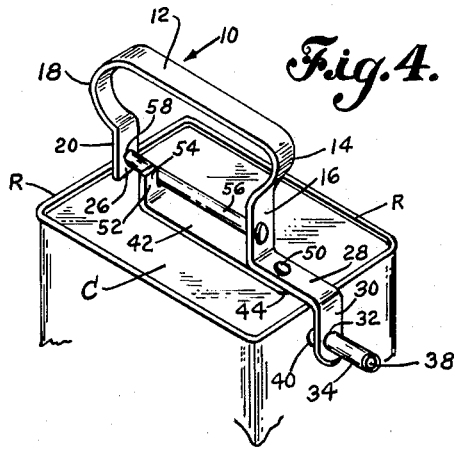
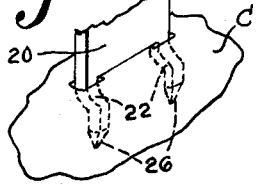
INVENTOR.
Angelo Serafini
BY Harold E. Cole
Attorney

United States Patent Office 3,231,137
Patented Jan. 25, 1966

3,231,137
COMBINATION HANDLE AND SPOUT DEVICE
Angelo Serafini, Boston, Mass.
(33 Faywood Ave., East Boston, Mass.)
Filed Sept. 4, 1964, Ser. No. 394,575
7 Claims. (Cl. 222—83)

This invention relates to a combination handle and spout device for attachment to a can or other container.

Reference is made to my pending patent application, Serial No. 335,965, filing date January 6, 1964.

One object of my invention is to provide a combination handle and spout device that provides a handle for attachment to the top of a container and a spout for attachment to the side thereof.

Another object is to provide said handle with penetrating means whereby the latter by a single, continuous movement will attach the handle to the container top and also provide air space in said top to assure free pouring of the liquid through the spout.

Still another object is to provide such a combination that will fit a wide range of sizes of containers, thus enabling one device to be used for practically all containers found in common use.

A further object is to provide such a device that is simple to use and can be produced in large quantities at a cost that permits its sale at a price well within the reach of those with ordinary incomes.

The foregoing and other objects which will appear as the nature of the invention is better understood, may be accomplished by a construction, combination and arrangement of parts such as is disclosed by the drawing. The nature of the invention is such as to render it susceptible to various changes and modifications, and, therefore, I am not to be limited to the construction disclosed by the drawing, nor to the particular parts described in the specification; but am entitled to all such changes therefrom as fall within the scope of my claims.

In the drawing:

FIG. 1 is a top plan view of my combination handle and spout device, the lever being shown in dash lines extending diagonally outward.

FIG. 2 is a side elevational view of my device in fully mounted position on a container, the dash lines indicating a portion of the container.

FIG. 3 is a sectional view taken on the line 3—3 of FIG. 2.

FIG. 4 is a perspective view showing my device mounted on a container having a rectangularly shaped top.

FIG. 5 is a perspective view similar to FIG. 4; but showing my device mounted on a container having an oval top.

FIG. 6 is a fragmentary, perspective view showing a handle leg attached to a container, the penetrating prongs being shown in dash lines extending into the container.

As illustrated, my handle and spout device has a holder 10 having a grasping portion 12, a leg 14 having an inset portion 16, and another leg 18 having an inset portion 20. Two penetrating prongs 22 provide penetrating means. They extend from, and outer end parts are inset from, said leg portion 20 and terminate in pointed ends 26 that are adapted to penetrate the top of a can or other container C. Extending angularly beyond said leg portion 16 is a mounting member 28 that is integral with said holder 10 as shown, and has an angular spout support 30 having a hole 32 therethrough.

A spout or hollow tube 34 has a slanting penetrating portion 36 at one end that enters said container C as later explained, and a discharge portion 38 at the opposite end that extends outwardly of said mounting member 28 and through which the liquid in said container C pours out. Intermediate the ends of said spout 34 is a rubber seal 40 that fits tightly around the latter and bears against the inner surface of said spout support 30 to prevent any leakage through said hole 32.

A lever 42 is pivotally attached to said mounting member 28 and it has a cam-shaped end 44. A hole in said lever 42 and another hole 48 in said mounting member 28 are in alinement and receive a rivet 50 that pivotally attaches said lever to and below said mounting member.

At the end opposite said cam end 44 is an angular stop member 52 that has an outwardly extending stop finger 54 at a side extremity thereof that serves to limit the movement of said lever.

A fastener member 56 shown as an elongate bolt passes through said leg inset portion 16 and through a hole 58 in said leg inset portion 20 and in normal or pouring position it preferably makes frictional contact with said fastener member 56 at a screw-threaded portion 60 of the latter. A wing nut 62 is screw-threadedly attached to the latter portion, the tightening of which serves to tighten my device on the container C.

In use, my device is placed on the top of said container C with the spout penetrating portion 36 at the outside of and just below the top rim R of said container. Said lever 42 is in swung-away position as shown in dash lines in said FIG. 1, but with the cam-shaped end 44 in contact with the inner edge of said rim R. Pressure is applied downwardly to the top of the can and said pointed ends 26 penetrate said top and enter into the interior of the container. Since parts of said prongs 22 are inset, as they follow said pointed ends 26 into the container, they make holes in the container larger than the diameter of the prongs, thereby providing some space outwardly of said prongs for air to enter the container.

The lever 42 is rotatably moved to press against said rim R which applies pressure to draw said spout penetrating portion 36 against the exterior of the container, drawing it inwardly as the cam movement continues until the side of the container is pierced. The spout 34 enters and is in communication with the interior of the container, thus enabling the user to pour the contents through it.

Said lever 42 is now directly under said bolt 56 with said finger 54 at one side of and in contact with the latter. Said wing nut 62 is screwed onto said bolt 56 tightly against said leg inset portion 20 until my device is tightly attached to said container C.

What I claim is:

1. A combination handle and spout device for containers comprising a holder embodying a grasping portion, two legs spaced apart extending from the latter, one of said legs having penetrating means adapted to pierce the top of a container, a mounting member attached to and extending angularly outward beyond the other said leg, a support extending angularly from one end of said mounting member, a spout attached to said support and extending therethrough and embodying a penetrating portion at one side of said support below and spaced from said mounting member, and a discharge portion on the spout positioned on the opposite side of said support, a lever pivotally attached to said mounting member having a cam portion at one end, said cam portion adapted to overlie said spout penetrating portion in position of use and a tightening member extending between said legs.

2. A combination handle and spout device as set forth in claim 1, said lever embodying an angle portion at one end having a stop finger extending upwardly adapted to abut said tightening member in position of use.

3. A combination handle and spout device as set forth in claim 2 in which said stop finger is at a side extremity of said angle portion.

4. A combination handle and spout device as set forth in claim 1, said penetrating means embodying an inwardly extending prong extending, below said lever, said prong having a pointed end.

5. A combination handle and spout device as set forth in claim 1, said penetrating means embodying two prongs spaced apart and below said lever, each having an inset portion.

6. A combination handle and spout device for containers comprising a holder embodying a grasping portion, two legs spaced apart extending from the latter, one of said legs having penetrating means adapted to pierce the top of a container, a mounting member attached to and extending angularly outward beyond the other said leg, a support extending angularly from one end of said mounting member, a spout attached to said support and extending therethrough and embodying a penetrating portion at one side of said support below and spaced from said mounting member, and a discharge portion on the spout positioned on the opposite side of said support, a lever pivotally attached to said mounting member having a cam portion at one end said cam portion adapted to overlie said spout penetrating portion in position of use and a tightening member extending between said legs, said lever embodying an angle portion at one end having a stop finger extending upwardly adapted to abut said tightening member in position of use, said penetrating means embodying a prong having an inset portion.

7. A combination handle and spout device in combination with a container having a top and an upper rim surrounding said top, said device comprising a holder embodying a grasping portion, two legs spaced apart extending from the latter, one of said legs having a prong below said lever having an inset portion, said prong with said inset portion extending through said top into the interior of said container, a mounting member attached to the other of said legs, said mounting member positioned above said container top extending angularly beyond said holder and over said rim, a support extending angularly from one end of said mounting member down the side of said container, a spout attached to said support and extending therethrough and embodying a penetrating portion that extends into the interior of said container a lever pivotally attached to said mounting member having a cam portion at one end overlying said spout penetrating portion in position of use, being in said space between said spout penetrating portion and said mounting member and in contact with said container rim inner surface and tightening means extending between said legs.

References Cited by the Examiner
UNITED STATES PATENTS

| | | | |
|---|---|---|---|
| 948,787 | 2/1910 | Luttich | 248—65 |
| 1,960,152 | 5/1934 | Grundhand et al. | 222—83.5 |
| 2,009,392 | 7/1935 | Demmler et al. | 222—83 |
| 2,288,359 | 6/1942 | Jenkins | 294—34 |

LOUIS J. DEMBO, *Primary Examiner.*

WALTER SOBIN, *Assistant Examiner.*